United States Patent [19]

Hologa et al.

[11] 4,296,273
[45] Oct. 20, 1981

[54] SUPPORT ASSEMBLY FOR HIGH CURRENT BUS BARS

[75] Inventors: Zygmunt Hologa; Krystyn Madeyski; Adam Kurowski, all of Katowice, Poland

[73] Assignee: Przedsiebiorstwo Montazu Elektrycznego "Elektrobudowa", Katowice, Poland

[21] Appl. No.: 126,742

[22] Filed: Mar. 3, 1980

[51] Int. Cl.³ .............................................. H02G 5/06
[52] U.S. Cl. .................................................. 174/99 B
[58] Field of Search ................. 174/68 B, 99 B, 99 E, 174/149 B, 171, 16 B, 27

[56] References Cited

U.S. PATENT DOCUMENTS

| 3,221,097 | 11/1965 | Cognet et al. | 174/99 B |
|---|---|---|---|
| 3,351,705 | 11/1967 | Niemoller | 174/99 B |
| 3,483,396 | 12/1969 | Lightbody et al. | 174/99 B X |
| 3,569,606 | 3/1971 | Clin | 174/99 E X |
| 3,809,801 | 5/1974 | Niemoller et al. | 174/99 B |

FOREIGN PATENT DOCUMENTS

| 74080 | 6/1976 | Poland | 174/99 B |
|---|---|---|---|
| 89126 | 7/1978 | Poland | 174/99 B |

OTHER PUBLICATIONS

Brown Boveri Catalogue No. D Si 30274 E entitled "Single Phase High Current Busducts up to 40 KA and more", 8 pp.

Primary Examiner—Laramie E. Askin
Attorney, Agent, or Firm—Ladas & Parry

[57] ABSTRACT

This invention relates to an assembly for supporting high-current bus bars, particularly those in tubular enclosures, and it solves the problem of design, as well as assembly and disassembly, of the supporting insulators of high-current bus bars. Each insulator of a high-current bus bar, particularly that in a tubular enclosure supporting the bus bar, is fastened to a bracket mounted to the opposite inner sides of the flange of an assembly-inspection hole, preferably of an oval shape, whereas two holes on both sides of the bracket form assembly-inspection spaces for the insulator and the insulator cap covered, together with the bracket, by means of a lid. Moreover, in order to make possible a slidable motion of the insulator, to which the bracket has been mounted, a special shock-absorbing member has been introduced between the cover and the bracket.

2 Claims, 4 Drawing Figures

SUPPORT ASSEMBLY FOR HIGH CURRENT BUS BARS

This invention relates to a support assembly for high current bus bars, particularly those in tubular enclosures, to be used in single-phase and three-phase switchgear of generators and unit transformers in power plants and other power systems.

Those skilled in the art know designs representing supporting insulators for high current bus bars, particularly those in tubular enclosures.

One of such designs is the design by the Brown Boveri Company according to the publication No. D Si 30 274 E, wherein the supporting insulator secured to the assembly hole cover is introduced into the tubular enclosure through an assembly hole of diameter slightly exceeding the external diameter of the insulator. The bus bar in the above-mentioned design has the shape of a tube or a polygon and rests freely on three supporting insulators disposed around the circumference of the said enclosure (insulators are not connected permanently to the bus bars by means of caps).

The above mentioned design has the following drawbacks:

the insulator must be removed from the enclosure before each maintenance operation (visual examination, cleaning), adjustment of the insulator height is difficult, in case of disassembly, out-of-adjustment of the bus bar on the supporting insulators takes place, disassembly of only one insulator can lead to damaging the bus bar compensator because of sagging of the bus bar.

The second design known from the present state of art is the one wherein the bus bar is secured to an insulator by means of an insulator cap, as shown in the Polish Patent Specification No. 89,126. In the latter design, the insulator is secured to the enclosure in a similar way as in that previously mentioned. Moreover, the enclosure is provided with additional inspection holes besides the assembly holes, or detachable parts of the enclosure for making it possible to manipulate the insulator caps. These holes serve for visual examination and maintenance of the insulator, which is extremely troublesome, particularly in the case of a considerable enclosure diameter. Additional inspection holes cause the machining of the enclosures to be more time-consuming and lead to improper tightness of the enclosure structure. In case of inspection holes of three-phase enclosures sized 0.5×0.5 m, the mechanical strength of the enclosures is considerably lower, which can lead in effect to an increased number of the supporting structures of such an enclosure.

Still another design of securing insulators to tubular enclosures is that known from the U.S. Pat. No. 3,351,705 which makes possible free access to the insulator securing screws in the bottom portion and to the insulator cap through a rectangular opening, without the necessary disassembly of the entire insulator. However, on the other hand, this has several disadvantages, namely:

requires an increased number of structural members for securing the insulator (bottom plate 24, cross bars 116, securing members 126), it makes difficult the assembly and disassembly of an insulator, which can cause the bus bar to fall and the bus bar compensators to be damaged, the insulator depth is not easily adjustable, which makes difficult centering of the bus bar in the tubular enclosure, the insulator must be provided with a shock-absorbing springhead for supporting the bus bar with three insulators, as known from the publication by Brown Boveri.

Moreover, in bus bars of high power generator switchgear, a special shock-absorbing insulator must be mounted and provided with a special socket with a shock-absorbing spring head on the side of the bus bar, as shown in the catalogue published by the Brown Boveri Company No. D Si 302 74E, in the Polish Patent Specification No. 74,080 and, partly, in the U.S. Pat. No. 3,351,705. A serious drawback of the above-mentioned design is a necessary use of a special insulator differing from the two remaining ones for supporting the bus bar.

It is an object of this invention to eliminate the disadvantages of the known designs by development of a new assembly for mounting the high current bus bar supporting insulators, particularly those in tubular enclosures.

This aim has been achieved by securing all insulators intended for supporting the bus bar located inside the enclosure to a bracket, which is in turn fastened to inner opposite elongated sides of an oval-shaped assembly-inspection hole flange. Two semicircular spaces on both sides of the above-mentioned bracket thus formed represent assembly-inspection holes for the supporting insulator, the said bracket and holes being covered by an oval cover. Preferably the bracket has an open-sided cuboid shape with an inwardly facing base on which the insulator is mounted.

However, in special cases, the bracket can be secured, if required, to the inner opposite elongated sides of the oval-shaped assembly-inspection hole flange in a slidable manner, thus making it possible for the bracket together with the supporting insulator to move toward the centre of the enclosure due to insertion of a shock-absorbing spring member between the bracket and the assembly-inspection hole cover.

Combination of the above-mentioned technical means will enable the following advantages to be obtained:

Owing to the oval shape of the enclosure hole, the hole can be used both for assembly purposes and for the inspection of the insulator and cap.

Location of the insulator on a bracket enables each insulator and insulator cap to be subjected to visual examination and maintenance upon removal of the cover without dismounting the insulator itself. In case of a necessary replacement of an insulator, an extra insulator can be mounted on the bracket, and thus the damaged one can be removed without changing the position of the bus bar. The bracket base facing the center of the enclosure facilitates handling the fasteners (not shown) which secure the bracket to the sides of the oval flange.

Fastening of the insulator bracket to the inner opposite sides of the assembly-inspection hole facilitates the assembly of the insulator bracket and makes possible an adjustment of the bracket toward the centre of the enclosure or along the longer axis of the oval hole. Covering of the hole with an oval cover leads in effect to a simpler structure and better tightness of the enclosure. If a shock-absorbing spring insulator has to be mounted, the insulator bracket may be secured to the opposite inner side of the assembly-inspection hole in a slidable way, thus making possible co-axial motion of the insulator bracket toward the centre of the enclosure and insertion of a shock-absorbing spring member between the insulator bracket and the oval shaped hole cover. An oval shape of the assembly-inspection hole requires, contrary to some other shapes, smallest flange length under assumption of the necessary accessibility for assembly and inspection purposes, this being an important asset if the hole flange edges are welded to the enclosure. Moreover, a longitudinal location of the oval hole relative to the longitudinal enclosure axis does not impoverish the strength of the enclosure. Free access to the insulator cap on the side of the insulator base enables the distance between the hole and the cap to be reduced by reducing the insulator height and thus facilitates assembly operations.

For a fuller understanding of the nature and objects of the invention reference should be made to the following detailed description, taken in conjunction with the accompanying drawing, in which.

Figure 1:
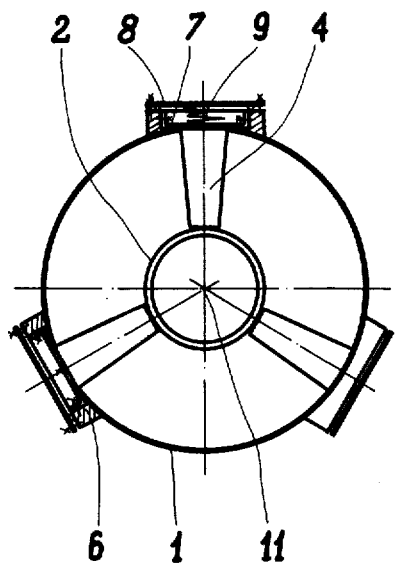
FIG. 1 is a cross section of a high-current bus system of a single-phase generator switchgear.
Figure 2:
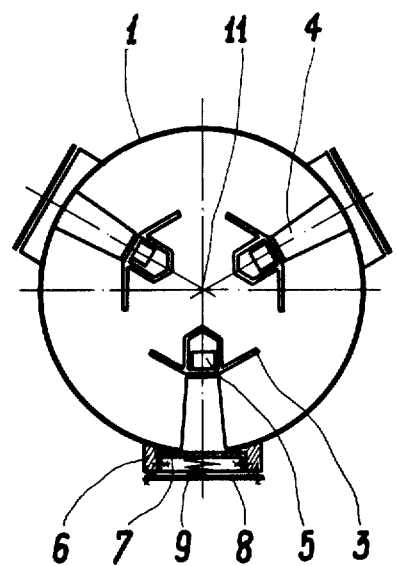
FIG. 2 is a cross section of a three-phase high-current bus system.
Figure 3:
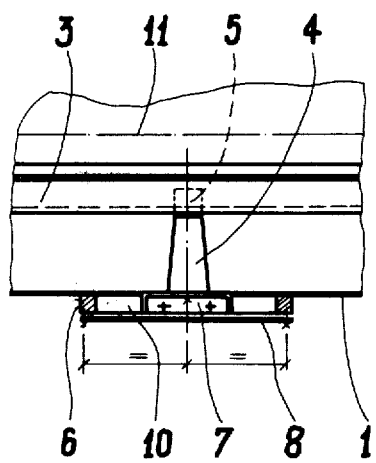
FIG. 3 shows a section through the longer axis of the assembly-inspection hole at the point of the insulator mounting.
Figure 4:
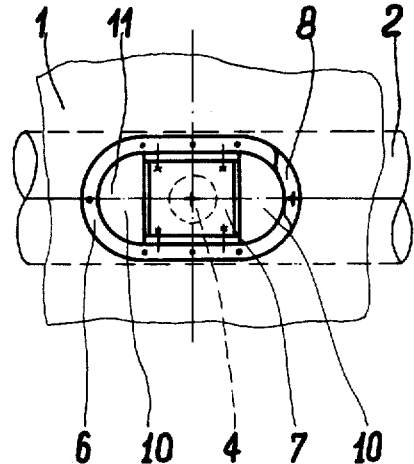
FIG. 4 is a bottom view of an oval-shaped inspection hole upon removal of the cover.

The supporting assembly is adapted for supporting bus bars 2 and 3 inside a tubular enclosure 1. A cuboid-shaped bracket 7 is secured to the opposite inner sides of an oval flange 6 of an oval assembly-inspection hole along its symmetry axes, whereas the remaining free spaces on both sides of bracket 7 form semicircular assembly holes 10 for the supporting insulator 4 and the insulator cap 5, while the bracket 7 and the assembly-inspection holes 10 are closed by a cover 8. Moreover, in special cases, the bracket 7 can be connected, if required, to the opposite inner sides of the oval flange 6 of the assembly-inspection hole in a slidable way, thus making possible a co-axial motion of the bracket 7 together with the supporting insulator towards the centre 11 of the enclosure with a shock-absorbing spring member 9 located between the bracket 7 and the cover 8.

We claim:

1. In a support assembly for high current bus bars, including an elongated tubular enclosure having a generally circular cross-section, a plurality of insulators arranged in groups of three and being radially inwardly directed with respect to said enclosure, and spaced circumferentially 120° from each other, and means for adjustably mounting said insulators relative to said enclosure and providing access to the interior of said enclosure, the improvements being characterized in that said insulator mounting and access means comprises a series of longitudinally extending oval-shaped openings in said tubular enclosure, an integral oval-shaped flange defining each said opening, a cuboid-shaped bracket means mounted across each oval flange between opposite elongated sides thereof, each said bracket means including a square base extending radially inwardly toward the center of said enclosure, said insulator being secured to said bracket base, said cuboid-shaped bracket mounted over said oval-shaped opening defining a pair of semicircular spaces providing access for inspection to the interior of said enclosure, and located at longitudinally spaced opposite sides of said bracket means, and an oval-shaped cover releasably secured to each said oval-shaped flange and overlying said bracket means.

2. A support assembly according to claim 1, wherein the opposite sides of said bracket means are slidably mounted on said corresponding elongated opposed sides of said oval-shaped flange permitting radial adjustments of said bracket means and insulator mounted thereon relative to the center of said enclosure, and a shock-absorbing spring means is mounted between said base of said bracket means and said oval-shaped cover.

* * * * *